United States Patent

[11] 3,546,395

[72] Inventor Peter O. Schuh
Indianapolis, Ind.

[21] Appl. No. 697,785
[22] Filed Jan. 15, 1968
[45] Patented Dec. 8, 1970
[73] Assignee Bell Telephone Laboratories, Incorporated
Murray Hill, Berkeley Heights, N.J.
a corporation of New York

[54] ACTIVE TELEPHONE SET SPEECH NETWORK EMPLOYING TRANSISTOR FEEDBACK LOOP FOR SIDETONE BALANCE AND EQUALIZATION
12 Claims, 2 Drawing Figs.

[52] U.S. Cl. .......... 179/81, 179/170
[51] Int. Cl. .......... H04m 1/58
[50] Field of Search .......... 179/81(A), 170(NHC)

[56] References Cited

UNITED STATES PATENTS 3,170,043 2/1965 Hohmann .......... 179/81(A)
3,227,812 1/1966 Schlichte .......... 179/81(A)

*Primary Examiner*—Kathleen H. Claffy
*Assistant Examiner*—William A. Helvestine
*Attorneys*—R. J. Guenther and Edwin B. Cave

ABSTRACT: In an active network employed as the speech circuit for a subscriber's telephone set, interconnected transistors avoid the need for inductive hybrid coils by utilizing a feedback loop to provide sidetone balance, and gain equalization is employed to compensate for changes in line impedance.

INVENTOR
P. O. SCHUH
BY [signature]
ATTORNEY

ACTIVE TELEPHONE SET SPEECH NETWORK EMPLOYING TRANSISTOR FEEDBACK LOOP FOR SIDETONE BALANCE AND EQUALIZATION

BACKGROUND OF THE INVENTION

1. Field of the Invention

This invention relates to telephone set voice circuits and more particularly to voice circuits devoid of inductive hybrid sidetone balancing networks.

2. Description of the Prior Art

Two-wire subscriber telephone circuits are typically arranged in hybrid type configurations with the transmitter and receiver mutually conjugate. As a result, signals generated either in the transmitter or in the receiver are substantially or entirely muted in the other. More specifically, speech signal energy generated by the transmitter is normally divided between adjacent inductance coil legs in proportion to the impedance match between the network and the line, one portion of the energy being applied to the line and the other portion being dissipated in the balancing network. Owing to the relative polarities of the interconnected coils, inductive effects tend to cancel so that very little sidetone energy is coupled into the receiver. The level of sidetone required to approximate the quality of direct conversion is established by controlling the impedance match between the network and the line.

As a result of the undesirably large bulk and high cost of telephone set hybrid inductive coils, voice circuits omitting such coils have been devised, the hybrid function being performed instead by resistive networks. Such circuits are shown, for example, in U.S. Pat. No. 2,838,612, issued to L. C. Pocock June 10, 1958, and in U.S. Pat. No. 3,170,043, issued to L. A. Hohmann, Jr., Feb. 16, 1965. The elimination of hybrid coils from telephone speech networks by utilizing forms of the type disclosed by Pocock and Hohmann has become increasingly attractive, owing to the recent advances in the art of integrated and thin film circuitry. Particularly in noninductive circuits, these advances have resulted in radical reductions in circuit size and in substantial improvements in circuit reliability and cost.

Despite the advances of resistive hybrid circuits over circuits employing inductive coils, all telephone hybrid or bridge circuits in the prior art share a common disadvantage of low transmitting efficiency. More specifically, this disadvantage involves the dissipation in the balancing network of the hybrid of substantially one-half of the signaling power generated by the transmitter. The significance of this condition may readily be appreciated when it is realized that under ideal conditions the elimination of such power losses could allow the use of telephone transmission lines which may theoretically have 6 db. more voltage attenuation than present lines. Such use could eventually result in a very significant savings in the cost of telephone transmission lines or in an increase in the range of telephones on conventional lines.

In addition to the fact that prior art resistive hybrid circuits have failed to provide a solution for the power loss problem generally inherent in all hybrid circuits, other unsolved problems have impeded the widespread commercial adoption of resistive voice network hybrid circuits. For example, the essentially resistive set impedance necessary to achieve an ideal impedance match between the set and line under certain conditions is difficult to attain, owing to the inductive reactance of conventional receiver units.

Accordingly, a general object of the invention is to improve telephone antisidetone networks.

A specific object is to reduce the loss of power that occurs in telephone antisidetone networks.

SUMMARY OF THE INVENTION

These and additional objects are achieved in accordance with the principles of the invention by the utilization of an active network that avoids the conventional need for inductive hybrid coils by employing the feedback loop of a transistor amplifier circuit to provide sidetone balance and gain equalization to compensate for changes in line impedance.

In one illustrative embodiment of the invention, a common base Darlington pair transistor combination is employed as the active element of an active network. A series pair of resistors is connected across the emitter-collector electrodes of the transistor pair. To provide a feedback loop that produces sidetone balance and ensures transmission voltage gain, the common terminal of the resistors is connected to one terminal of the receiver. This network is ideally suited for production in integrated circuit form inasmuch as most of the circuit elements are transistors or resistors; only a few capacitors and no inductors are employed.

DETAILED DESCRIPTION

Figure 1:
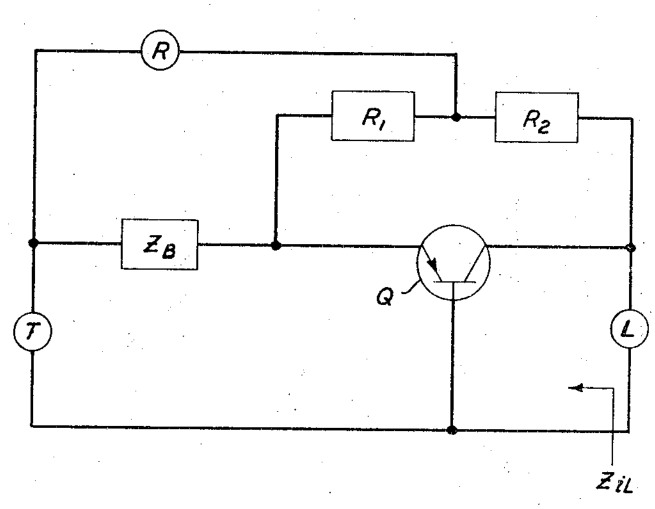
FIG. 1 is a schematic circuit diagram, partially in block form, of a generalized circuit form in accordance with the invention.

In one generalized form of the invention illustrated by the arrangement shown in FIG. 1, the circuit is a Y network in which the transmitter T may be considered simply as an ideal voltage source connected in the base-emitter circuit of a transistor Q. The base-collector terminals of transistor Q are connected across the terminals of the line L. One pair of networks $R_1$ and $R_2$ are connected in series across the emitter-collector terminals of transistor Q, and the receiver R is connected between the junction of the $R_1$, $R_2$ networks and one terminal of the transmitter T. In accordance with the invention an additional network $Z_B$ is bridged between a common terminal of the receiver R and the transmitter T and the emitter of the transistor Q.

The networks $R_1$, $R_2$ may be simple resistances, for example, and sidetone balance is utilized in a manner that lends itself to automatic balancing. In effect, the networks $R_1$ and $R_2$ together may be considered as a potentiometer. If the impedance ZB has the same reactance as the line L, components other than resistors, capacitors for example, may be used in place of resistors for the networks $R_1$ and $R_2$.

In the circuit of FIG. 1 it may be shown that the following relationships exist:

$$P_{LT}=\frac{V_T^2 L}{(T+Z_B)^2} \quad (1)$$

$$P_{RL}=\frac{V_L^2 R}{\left[R_2+L\left(1+\frac{R}{Z_B}\right)\right]^2} \quad (2)$$

$$Z_{iL}=TRR_2\left[\left(\frac{1}{T}+\frac{1}{Z_B}\right)\left(\frac{1}{R_1}+\frac{1}{R_2}+\frac{1}{R}\right)+\frac{1}{R}\left(\frac{1}{R_1}+\frac{1}{R_2}\right)\right] \quad (3)$$

and $$Z_B=\frac{LR_1}{R_1+R_2} \text{ for } P_{RT}=0 \quad (4)$$

where:

$P_{LT}$, $P_{RT}$ and $P_{RL}$ are the indicated power transfer rations;

$V_T$ is the transmitter T voltage;

and the remaining designations are the impedances of the correspondingly designated elements shown in FIG. 1.

Figure 2:
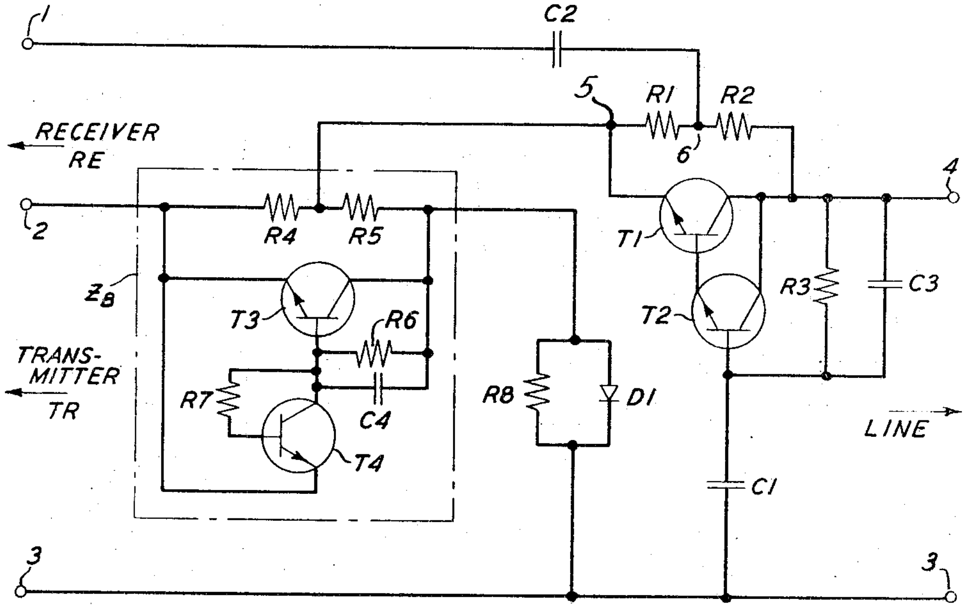
FIG. 2 is a schematic circuit diagram of a specific circuit of the form illustrated generally in FIG. 1.

In FIG. 2 which illustrates a specific circuit of the general form shown in FIG. 1, the combination of the common base Darlington connected transistor pair T1, T2 together with resistor R3, capacitor C1 and capacitor C3 provides a line powered amplifying circuit. High frequency roll-off stability for the amplifier is provided by capacitor C3. Capacitor C2 connected between terminals 1 and 6 provides DC blocking. The network $Z_B$ includes a transistor T3 which provides feedback by way of a resistor R6 and a capacitor C4. Transistor T4 and resistor R7 provide biasing and current gain control for transistor T3. These elements are suitably proportioned so that the impedance $Z_B$ has a magnitude less than but a phase angle substantially identical to that of the line impedance across terminals 3 and 4. Sidetone balance with transmit voltage gain is provided for by the feedback loop which includes resistors R1 and R2.

The combination of resistors R8, R5 and diode D1 changes the impedance $Z_B$ in order to compensate for line impedance changes, equalizes transmit and receive signals and also provides a low resistance path to minimize power dissipation on short loops.

In operation, outgoing speech signals from a transmitter TR, not shown, which is connected between terminals 2 and 3, are coupled through the circuit $Z_B$ by way of the Darlington pair transistors T1 and T2. The current in the collector circuit of transistors T1 and T2 appears at terminal 4, resulting in a voltage across terminals 3 and 4 which constitutes the transmitting output into the line.

The voltage across terminals 3 and 4 establishes a current through resistors R1 and R2 which is coupled back into the transistor combination T1, T2, resulting in a feedback current from the collector of T1 and T2 into terminal 4. This feedback current results in a lossless transmission from the current established in the transistor pair T1, T2 by the transmit speech signal.

Owing to the common base configuration of transistors T1 and T2, there is a negligible AC voltage drop between terminals 3 and 5. The receiver RE, not shown, connected between terminals 1 and 2, is connected by way of capacitor C2 to the junction point 6 of resistors R1 and R2. Resistors R1 and R2 are so proportioned that the resulting voltage drop is equal to that between terminals 2 and 3. It is this circuit that provides antisidetone performance in accordance with the invention. Under normal operating conditions there is a null between terminals 2 and 6.

The signal received from the line across terminals 3 and 4 establishes a voltage between terminals 3 and 6 which is distributed between the receiver and the transmitter. Current loss which would normally occur because of the relatively low resistance of resistor R1 is avoided, in accordance with the invention, as a result of the feedback loss coupling into transistors T1 and T2. A portion of the receiver voltage that appears across the transmitter TR is fed back into the transistor pair T1, T2 through the impedance circuit $Z_B$, thereby effectively decreasing the loss as a result of the feedback path through transistors T1, T2.

As indicated above, the impedance $Z_B$ is designed, in accordance with the invention, to be somewhat less than the impedance of the line but with an identical or close to identical phase angle. This arrangement ensures an effective voltage gain from terminals 2 and 3 to terminals 3 and 4. The combination of resistors R1 and R2 decreases this effective voltage gain to the point at which a null exists between terminals 2 and 6.

Resistor R8 increases the current of the circuit for supervisory relay purposes. On short loops resistor R5 is short circuited to ground insofar as AC voltage is concerned through diode D1, thus reducing the capacitance of the impedance of $Z_B$. This reduction causes a phase shift in the impedance of $Z_B$ to allow for the change in the phase shift of the line impedance that occurs on short loops. Additionally, the current through resistor R5 and diode D1 is sufficiently high to keep the power dissipation of the circuit at a minimum level on short loops.

It is to be understood that the embodiments disclosed herein are merely illustrative of the principles of the invention. Various modifications thereto may be effected by persons skilled in the art without departing from the spirit or scope of the invention.

I claim:

1. An active speech network for a telephone set comprising, in combination, a pair of line terminals, a Darlington pair transistor with the base-collector electrodes thereof connected across said terminals, a sidetone balancing network comprising a series pair of resistors connected between the collector-emmiter electrodes of said transistor, a transmitter, a receiver, an impedance network, means connecting said transmitter between one of said line terminals and a terminal of said last named network, and means connecting said receiver between the common terminal of said resistors and said terminal of said impedance network.

2. An active speech network for a telephone set comprising, in combination, a pair of line terminals, a transistor, means connecting the base electrode of said transistor to one of said line terminals, means connecting the collector electrode of said transistor to the other of said line terminals, first and second resistive networks in series relation connected between the collector and emitter electrodes of said transistor, a transmitter, a receiver and an impedance network each having a common terminal, the other terminal of said transmitter being connected to the base of said transistor, the other terminal of said network being connected to the emitter of said transistor and the other terminal of said receiver being connected to the common terminal between said resistance networks.

3. Apparatus in accordance with claim 2 wherein said resistive networks each comprise only a single respective resistance device.

4. Apparatus in accordance with claim 2 wherein said impedance network provides bias current for said transmitter and has an impedance with a magnitude less than and a reactance substantially the same as the line to which said line terminals are to be connected.

5. Apparatus in accordance with claim 4 including multifunction means for changing the impedance of said impedance network to compensate for line impedance changes.

6. Apparatus in accordance with claim 5 wherein said multifunction means comprises a resistive element and a diode connected in parallel relation between said impedance network and one of said line terminals.

7. An active speech network for a telephone set comprising, in combination, a transistor including base, emitter and collector electrodes, means connecting said base and collector electrodes to a respective one of a pair of line terminals, a sidetone balancing network comprising first and second resistive elements in series relation connected between said collector and emitter electrodes, a transmitter, a receiver, means including an impedance network connecting one terminal of said transmitter to said emitter electrode, means connecting the other terminal of said transmitter to one of said line terminals, means connecting one terminal of said receiver to the common terminal of said resistive elements, and means connecting the other terminal of said receiver to said one terminal of said transmitter.

8. Apparatus in accordance with claim 7 wherein said transistor comprises a Darlington connected transistor pair.

9. Apparatus in accordance with claim 8 including a parallel combination of a resistive element and a capacitive element connected between said base and collector electrodes.

10. Apparatus in accordance with claim 8 including a parallel combination of a resistive element and a diode connected between said impedance network and one of said line terminals.

11. An active speech network for a telephone set comprising, in combination: a pair of line terminals; a Darlington transistor pair having a base, collector and an emitter electrode, said collector electrode being connected to one of said terminals and means connecting said base electrode to the other of said terminals; first and second resistive elements connected in series relation between said emitter and collector electrodes; a transmitter; a receiver; an impedance network comprising third and fourth resistive elements connected in series relation; a second transistor having the emitter and collector electrodes thereof each connected to a respective one of the unconnected terminals of said third and fourth resistive elements; a third transistor having the collector thereof connected to the base of said second transistor and the emitter thereof connected to the emitter of said second transistor; a fifth resistive element connected between the collector and base of said third transistor; and a parallel combination of a sixth resistive element and a capacitive element connected between the collector and base of said second transistor; means connecting one terminal of said receiver to the common terminal of said first and second resistive elements; means connecting the other terminal of said receiver to the emitter of said second transistor; means connecting said transmitter between said other terminal of said receiver and said other one of said line terminals; and means connecting the common junction of said third and fourth resistors to the emitter electrode of said Darlington transistor pair.

12. Apparatus in accordance with claim 11 including a parallel combination of a resistive element and a diode connected between the collector electrode of said second transistor and said other one of said line terminals, said means connecting the base electrode of said Darlington pair to said other one of said line terminals including a capacitive element, and said means connecting one terminal of said receiver to the common terminal of said first and second resistive elements including a capacitive element.